United States Patent [19]
Leasure et al.

[11] Patent Number: 6,009,595
[45] Date of Patent: Jan. 4, 2000

[54] VEGETATION DEBRIS BLOWER AND CART ASSEMBLY

[75] Inventors: Jeremy D. Leasure, Charlotte; Harold M. Bigham, Monroe, both of N.C.

[73] Assignee: Deere & Company, Charlotte, N.C.

[21] Appl. No.: 09/145,059

[22] Filed: Sep. 1, 1998

[51] Int. Cl.[7] ........................................................ A47L 5/28
[52] U.S. Cl. ........................... 15/329; 15/327.5; 15/405; 417/234
[58] Field of Search ............................ 15/339, 405, 329; 417/234

[56]  References Cited

U.S. PATENT DOCUMENTS

| | | | |
|---|---|---|---|
| 3,363,278 | 1/1968 | Davidson | 15/405 |
| 4,118,826 | 10/1978 | Kaeser . | |
| 4,458,377 | 7/1984 | Frohbieter | 15/405 X |
| 4,797,072 | 1/1989 | Berfield et al. | 15/329 X |
| 5,090,088 | 2/1992 | Toth | 15/405 |
| 5,119,619 | 6/1992 | Zappia . | |
| 5,195,208 | 3/1993 | Yamami et al. . | |
| 5,272,858 | 12/1993 | Bonis . | |
| 5,294,063 | 3/1994 | Bote . | |
| 5,722,110 | 3/1998 | McIntyre et al. . | |
| 5,735,018 | 4/1998 | Gallagher et al. . | |

FOREIGN PATENT DOCUMENTS

| | | | |
|---|---|---|---|
| 2256875 | 5/1973 | Germany | 15/405 |
| 471314 | 5/1952 | Italy | 15/405 |

*Primary Examiner*—Chris K. Moore
*Attorney, Agent, or Firm*—Perman & Green, LLP

[57] ABSTRACT

A vegetation debris blower and carrying cart assembly is provided with a quick mount and dismount assembly. The cart has two vertically orientated mounting tubes. The blower has a mounting bracket attached to its bottom rear end. The mounting bracket has two U-shaped rods with downward extending legs adapted to be slid into the tubes to thereby quickly mount the blower to the cart by merely vertically lowering the blower onto the cart. The blower can be quickly dismounted from the cart by merely upwardly raising the blower from the cart with the rods merely sliding out of the tubes.

17 Claims, 3 Drawing Sheets

VEGETATION DEBRIS BLOWER AND CART ASSEMBLY

BACKGROUND OF THE INVENTION

1. Field of the Invention

The present invention relates to vegetation debris blowers and, more particularly, to a cart for operably carrying a vegetation debris blower.

2. Prior Art

U.S. Pat. No. 5,722,110 discloses a carriable vacuum which can be removably attached to a wheeled carriage with a stud, knob and extension. U.S. Pat. No. 5,294,063 discloses a blower/vacuum unit removably mountable to a mobile support.

SUMMARY OF THE INVENTION

In accordance with one embodiment of the present invention a vegetation debris blower cart is provided comprising wheels and a frame having a handle. The frame is connected to the wheels and has at least two parallel tubes on the frame which are substantially vertically orientated. The tubes are sized, shaped and spaced relative to each other to have posts on the blower inserted into top open ends of the tubes.

In accordance with another embodiment of the present invention a combined hand-held vegetation debris blower and cart assembly is provided comprising a hand-held vegetation debris blower and a cart. The cart has a frame with a handle and wheels. The assembly further comprises means for quick mounting and dismounting of the blower to the cart. The means for quick mounting and dismounting comprises a set of tubes and a set of rods separately connected to the blower and the cart. The rods are inserted into open ends of the tubes by moving the blower vertically downward onto the cart to quickly mount the blower to the cart, and wherein the blower is moved vertically upward to slide the tubes and rods apart and thereby quickly dismount the blower from the cart.

In accordance with one method of the present invention a method of mounting a hand-held vegetation debris blower to a cart is provided comprising steps of providing the blower with a downward extending rod at a rear end of the blower; providing the cart with a blower mounting tube; and lowering the blower onto the cart and vertically sliding the rod into an open end of the tube. The blower can be vertically raised upward from the cart to slide the rod out of the tube and thereby dismount the blower from the cart.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
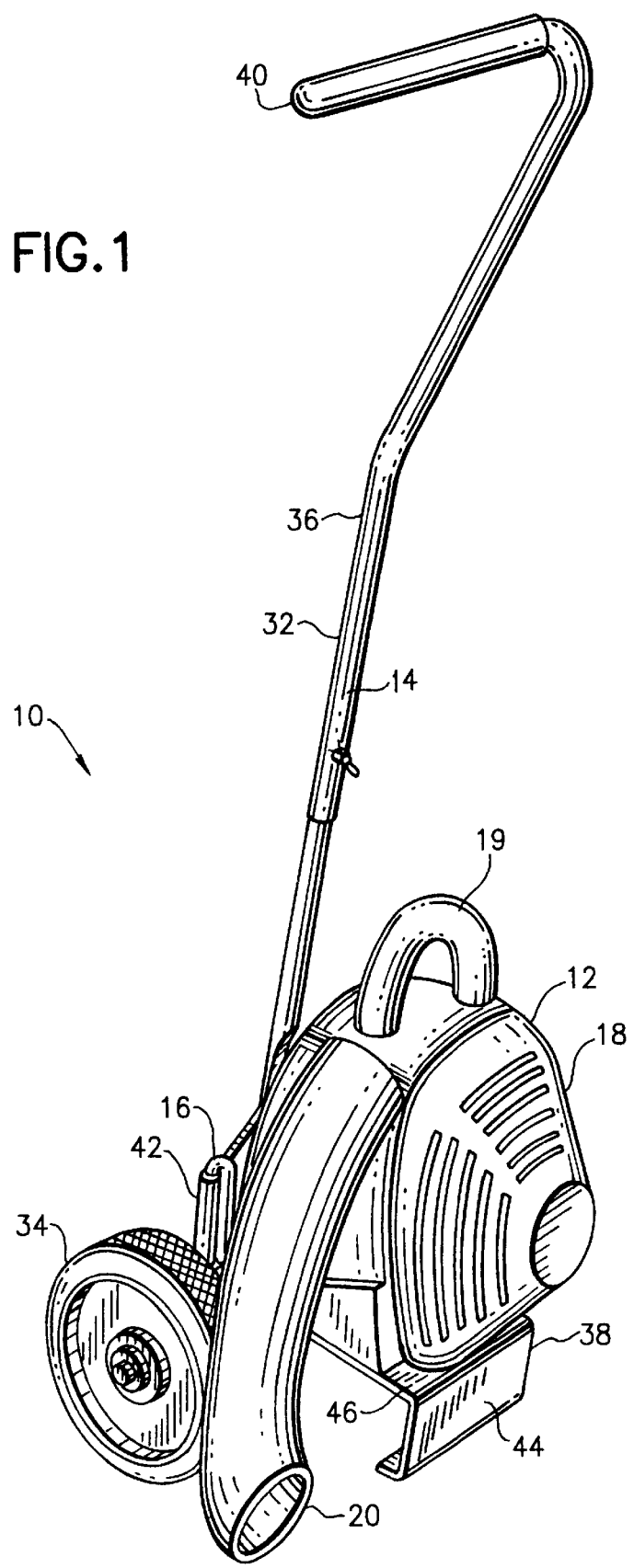
FIG. 1 is a perspective view of a combined hand-held debris blower and cart assembly incorporating features of the present invention.

Referring to FIG. 1, there is shown a perspective view of a combined hand-held vegetation debris blower and cart assembly 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Figure 2:
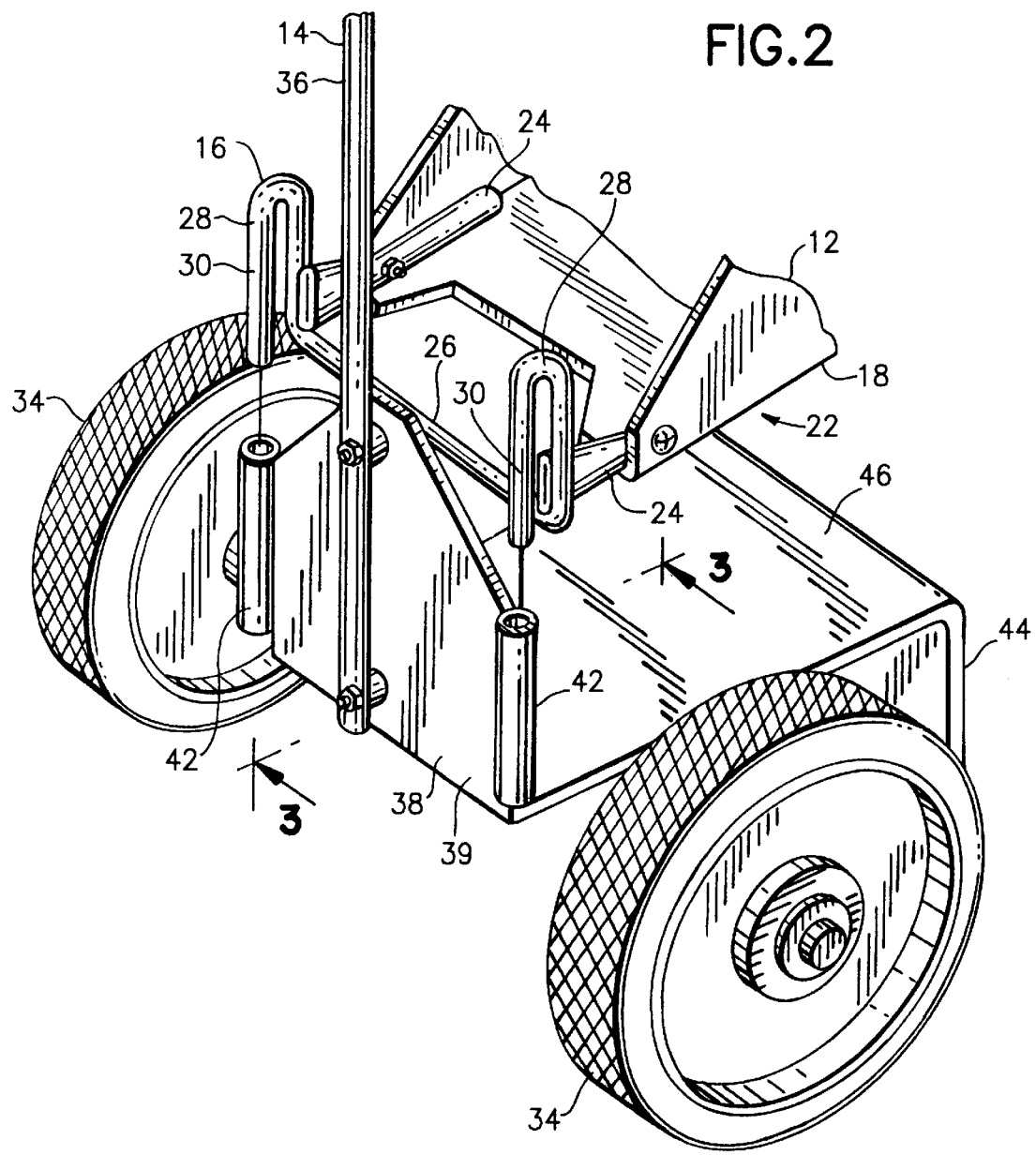
FIG. 2 is a partial exploded rear and left side perspective view of the assembly shown in FIG. 1.

The assembly 10 generally comprises a blower 12 and a cart 14. The blower 12 is a hand-held type of unit which is generally well known in the art with the exception of an additional mounting bracket 16 (see FIG. 2). The blower 12 is a power driven unit having a motor, an impeller or fan (not shown), a housing 18 with a carry handle 19, and an air discharge chute or tube 20. In a preferred embodiment the blower 12 can be converted into a vacuum as is well known in the art. Referring also to FIG. 2, the bottom of the housing 18 has an underside 22 that is shaped to provide a support surface for resting the housing upright on the ground. Attached to the bottom rear end of the housing 18 is the mounting bracket 16.

The mounting bracket 16 is preferably a single member made of metal. The bracket 16 includes two forward facing mounting sections 24, a center connecting bar section 26, and two general upsidedown U-shaped mounting sections or rods 28. The U-shaped mounting sections 28 have rear facing leg sections or portions 30 which are cantilevered in a downward direction parallel to each other. The leg sections 30 function as sliding mounting posts. In a preferred embodiment the connecting bar section 26 and the U-shaped sections 28 are formed by a one-piece bar of metal that is bent into shape. The forward facing mounting sections 24 are two separate members that are welded to the bar of metal. However, any suitable manufacturing technique could be used to make the bracket 16. In addition, rather than two forward facing mounting sections 24, alternative shapes or means could be used to mount the bracket to the housing of the blower. Alternative rearward facing mounting sections could also be provided as further understood below.

The cart 14 generally comprises a frame 32 and wheels 34. The frame 32 has a first section 36 and a second section 38. The first section 36 has a handle 40. The second section 38 has a rear end 39 that is attached to the first section 36 by fasteners. An axle 41 (see FIG. 3) connects the two wheels 34 to a bottom underside of the second section 38. The rear end 39 of the second section 38 has two tubes 42. A front end of the second section 38 has a ground support leg 44. A middle of the second section 38 connects the ground support leg 44 to the rear end 39 and axle 41. The two tubes 42 are generally vertically orientated, spaced and parallel to each other with open top ends. The tubes 42 are spaced from each other at a distance equal to the spacing distance between the two leg sections 30 of the mounting bracket 16. In a preferred embodiment, when the cart 14 is at rest on level ground (with the ground support leg 44 touching the ground) the tubes 42 are angled slightly forward. The two wheels 34 and the ground support leg 44 cooperate to stabily rest the cart on a ground surface. Rotation of the handle rearward will lift the leg 44 off of the ground and allow the cart and blower to be wheeled around on the wheels 34. The tubes 42 are located, at least partially, between the two wheels 34. The cross-sectional shape of the hollow center areas of the tubes 42 is preferably about the same as the cross-sectional shape of the leg sections 30.

Figure 3:
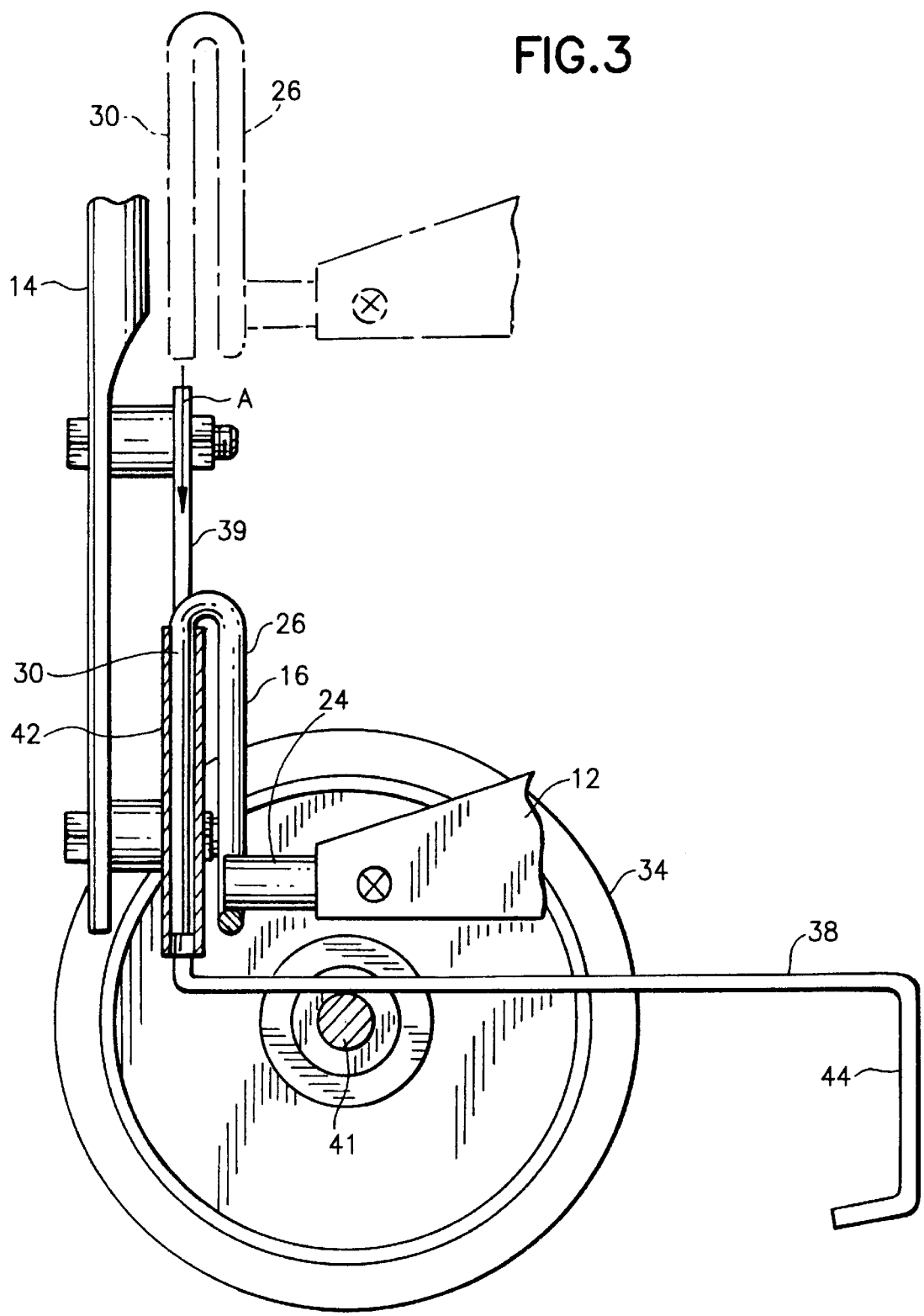
FIG. 3 a cross-sectional view taken along line 3—3 of FIG. 2.

Referring also to FIG. 3, the mounting bracket 16 and tubes 42 form a quick mounting and dismounting post and tube connection between the blower 12 and the cart 14. As noted above, the blower 12 is a hand-held type of unit. A user can carry the unit by the handle 19 while operating the unit.

However, for long periods of use this might fatigue the user. Thus, the cart 14 is provided to carry the blower 12 during prolonged periods of operation. The quick mounting and dismounting is provided such that the user can remove the blower 12 from the cart 14 for close or cumbersome areas which would be difficult or impossible for the assembly 10 to access with the cart 14. However, the present invention nonetheless allows the user to quickly reassemble the blower/cart assembly 10 once the close area is done. In this embodiment, in order to attach the blower 12 to the cart 14 the user merely aligns the bottoms of leg sections 30 with the tops of the tubes 42 and vertically lowers the blower 12 onto the cart 14 as shown by arrow A. The leg sections 30 slide into the tubes 42. The bottom of the blower's housing 18 comes to rest at a spaced distance from the top surface 46 of the middle section. Thus, the blower 12 extends in a cantilever fashion off of the frame 32. This can help to reduce at least some vibration transmission between the blower and the cart. The tubes 42 restrains movement of the blower 12 on the cart 14 in all directions except vertically upward. The weight of the blower 12 keeps the blower from moving vertically upward off of the cart 14. In order for a user to remove the blower 12 from the cart 14, the user can merely grasp the handle 19 and vertically lift the blower off of the cart in a direction reverse to direction A. The leg sections 30 merely slide out of the tubes 42 and the disassembly is complete.

In an alternative embodiment an additional retainer could be used if desired. In another alternate embodiment rather than two tubes and posts, a single mating sliding tube and post arrangement have means to prevent relative rotation, such as a key shape or square cross-sectional shape could be provided. The channels in the tubes and the posts could have any suitable cross-sectional shape. In another alternate embodiment the mounting bracket could have mounting tubes and the cart could have upward facing posts. The entrances to the tubes could also be flared for easier alignment and insertion of the posts into the tubes. It should be understood the terms "vertically" and "vertical" as used herein are not intended to be limited to pure vertical movement because the cart and tubes may be angled slightly forward or reverse on an uneven and slanted ground surface. These terms are instead intended to mean substantially vertical or generally vertical.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A vegetation debris blower cart comprising:

wheels; and a frame having a handle, the frame being connected to the wheels and having at least two parallel tubes on the frame which are substantially vertically orientated, wherein the tubes are sized, shaped and spaced relative to each other to have posts on the blower inserted into top open ends of the tubes.

2. A cart as in claim 1 wherein the cart has two of the wheels and a portion of the frame cooperates with the two wheels to stabily rest the cart on a surface.

3. A cart as in claim 1 wherein the frame has a first section comprising the handle and a second section connecting the handle to the wheels.

4. A cart as in claim 3 wherein a rear end of the second section has the two tubes.

5. A cart as in claim 4 wherein a front end of the second section has a ground support leg.

6. A cart as in claim 1 wherein the tubes are located between the wheels.

7. A combined hand-held vegetation debris blower and cart assembly comprising:

a hand-held vegetation debris blower;

a cart having a frame with a handle and wheels; and means for quick mounting and dismounting of the blower to the cart, the means for quick mounting and dismounting comprising a set of tubes and a set of rods separately connected to the blower and the cart, wherein the rods are inserted into open ends of the tubes by moving the blower vertically downward onto the cart to quickly mount the blower to the cart, and wherein the blower is moved vertically upward to slide the tubes and rods apart and thereby quickly dismount the blower from the cart.

8. An assembly as in claim 7 wherein the tubes are connected to the frame of the cart and the rods are connected to the blower.

9. An assembly as in claim 8 wherein the blower has a mounting bracket connected to a rear bottom end of the blower, and wherein the mounting bracket has the rods with portions cantilevered in a downward direction.

10. An assembly as in claim 9 wherein the rods have a general upside-down U-shape with one leg of the U-shape forming the cantilevered portions which are inserted into the tubes.

11. An assembly as in claim 7 wherein the cart has two of the wheels and a ground support leg of the frame cooperates with the two wheels to stabily rest the cart on a surface.

12. An assembly as in claim 7 wherein the frame has a first section comprising the handle and a second section connecting the handle to the wheels.

13. An assembly as in claim 12 wherein a rear end of the second section has the tubes.

14. An assembly as in claim 13 wherein a front end of the second section has a ground support leg.

15. An assembly as in claim 7 wherein the tubes are located between the wheels.

16. An assembly as in claim 7 wherein the blower is cantilever mounted to the cart.

17. A method of mounting a hand-held vegetation debris blower to a cart comprising steps of:

providing the blower with a downward extending post at a rear end of the blower;

providing the cart with a blower mounting tube; and lowering the blower onto the cart and vertically sliding the post into an open end of the tube, wherein the blower can be vertically raised upward from the cart to slide the post out of the tube and thereby dismount the blower from the cart.

* * * * *